US012665519B2

(12) United States Patent
Wang

(10) Patent No.: US 12,665,519 B2
(45) Date of Patent: Jun. 23, 2026

(54) CONTROL CIRCUIT FOR MULTI-OUTPUT SWITCHING CONVERTER

(71) Applicant: Chengdu Monolithic Power Systems Co., Ltd., Chengdu (CN)

(72) Inventor: Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 113 days.

(21) Appl. No.: 18/523,192

(22) Filed: Nov. 29, 2023

(65) Prior Publication Data

US 2024/0097571 A1 Mar. 21, 2024

Related U.S. Application Data

(63) Continuation of application No. 17/543,995, filed on Dec. 7, 2021, now abandoned.

(30) Foreign Application Priority Data

Dec. 21, 2020 (CN) .......................... 202011519080.3

(51) Int. Cl.
*H02M 3/335* (2006.01)
*H02M 1/00* (2007.01)

(52) U.S. Cl.
CPC ..... *H02M 3/33561* (2013.01); *H02M 1/0025* (2021.05); *H02M 1/0006* (2021.05); *H02M 3/33523* (2013.01)

(58) Field of Classification Search
CPC .. H02M 1/0006; H02M 1/0025; H02M 1/009; H02M 3/33507; H02M 3/33523; H02M 3/33561
See application file for complete search history.

(56) References Cited

U.S. PATENT DOCUMENTS

| | | | |
|---|---|---|---|
| 3,815,014 A | | 6/1974 | Davis et al. |
| 4,302,803 A | * | 11/1981 | Shelly ............... H02M 3/33561 363/20 |
| 4,447,841 A | | 5/1984 | Kent |
| 5,113,333 A | | 5/1992 | Ou |
| 2004/0257839 A1 | * | 12/2004 | Yang ................. H02M 3/33507 363/21.12 |
| 2008/0123372 A1 | * | 5/2008 | Yang ................. H02M 3/33507 363/21.16 |

(Continued)

FOREIGN PATENT DOCUMENTS

| | | |
|---|---|---|
| CN | 109274273 A | 1/2019 |
| EP | 0928059 A2 | 7/1999 |

*Primary Examiner* — Fred E Finch, III

(74) *Attorney, Agent, or Firm* — Perkins Coie LLP

(57) ABSTRACT

A control circuit, for controlling a switching converter having a primary switch, an energy storage component and a plurality of rectifiers, the control circuit having: a sample and hold circuit, configured to sample and hold a power source winding voltage provided by a power source winding of the energy storage component during when any one of the plurality of rectifiers is on, and to provide a sample&hold voltage based thereon; and a feedback circuit, configured to receive the sample&hold voltage and a power supply voltage of the control circuit, and to provide a feedback voltage based thereon; wherein the primary switch is controlled to be on and off based on the feedback voltage.

10 Claims, 5 Drawing Sheets

10

(56)          References Cited

U.S. PATENT DOCUMENTS

| | | | |
|---|---|---|---|
| 2009/0175057 A1* | 7/2009 | Grande | H02M 3/33523 |
| | | | 363/21.15 |
| 2015/0207422 A1 | 7/2015 | Huang et al. | |
| 2021/0021199 A1* | 1/2021 | Liu | H02M 3/33569 |
| 2022/0149740 A1 | 5/2022 | Li et al. | |
| 2022/0200462 A1 | 6/2022 | Wang | |

* cited by examiner

10

CONTROL CIRCUIT FOR MULTI-OUTPUT SWITCHING CONVERTER

CROSS-REFERENCE TO RELATED APPLICATIONS

This application is a continuation of U.S. patent application Ser. No. 17/543,995 filed on Dec. 7, 2021, which claims priority to and the benefit of Chinese Patent Application No. 202011519080.3 filed on Dec. 21, 2020, which are incorporated herein by reference in their entirety.

FIELD

The present invention relates generally to electronic circuits, and more particularly but not exclusively to a control circuit for multi-output switching converter.

BACKGROUND

In a switching converter comprising a transformer, multiple outputs could be obtained by adding secondary windings to the transformer. However, there is usually only one control loop for controlling all the outputs, which means only one of the outputs is fed back to the control loop to regulate all the outputs. The fed back output maybe the output providing the highest power, or the output providing low power but with high accuracy requirement. The output fed back to the control loop could be regulated accurately and timely. But the other outputs are barely regulated.

For better regulation to all the outputs, one of the solutions is that all the outputs are weighted and then fed back to the control loop. However, in some applications, e.g., primary side controlled flyback converter, the opto-coupler transferring signal between the primary side and the secondary side of the flyback converter is omitted to save cost, which makes the output at the secondary side hardly fed back to the primary side, let alone the multiple outputs. In these applications, how to provide a proper feedback and regulate all the outputs effectively is a big challenge.

SUMMARY

It is an object of the present invention to provide a control circuit for a switching converter with multiple outputs to effectively regulate the multiple outputs and the method thereof.

In accomplishing the above and other objects, there has been provided, in accordance with an embodiment of the present invention, a A control circuit, for controlling a switching converter having a primary switch, an energy storage component and a plurality of rectifiers, the control circuit comprising: a sample and hold circuit, configured to sample and hold a power source winding voltage provided by a power source winding of the energy storage component during when any one of the plurality of rectifiers is on, and to provide a sample&hold voltage based thereon; and a feedback circuit, configured to receive the sample&hold voltage and a power supply voltage of the control circuit, and to provide a feedback voltage based on the power supply voltage and the sample&hold voltage; wherein the primary switch of the switching converter is controlled to be on and off based on the feedback voltage.

In accomplishing the above and other objects, there has been provided, in accordance with an embodiment of the present invention, a switching converter having a flyback topology, comprising: a primary switch, coupled to a primary winding of an energy storage component; a sample and hold circuit, configured to sample and hold a power source winding voltage provided by a power source winding of the energy storage component during when any one of rectifiers of the switching converter is on, and to provide a sample&hold voltage based thereon; and a feedback circuit, configured to receive a power supply voltage and the sample&hold voltage, and to provide a feedback voltage based on the power supply voltage and the sample&hold voltage; wherein the primary switch is controlled to be on and off based on the feedback voltage.

In accomplishing the above and other objects, there has been provided, in accordance with an embodiment of the present invention, a control circuit, used with a switching converter having a flybuck topology, wherein the switching converter has an energy storage component, a primary switch and a rectifier, the control circuit comprising: a sample and hold circuit, configured to sample and hold a primary winding voltage provided by a primary winding of the energy storage component during when the rectifier is on, and to provide a sample&hold voltage based thereon; a feedback circuit, configured to receive a power supply voltage and the sample&hold voltage, and to provide a feedback voltage based on the power supply voltage and the sample&hold voltage; wherein the primary switch of the switching converter is controlled to be on and off based on the feedback voltage.

The control circuit and the feedback circuit of the switching converter provided by the present invention has simple circuit structure, and could effectively regulate the multiple outputs and improve the accuracy of each output of the switching converter.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

Figure 1:
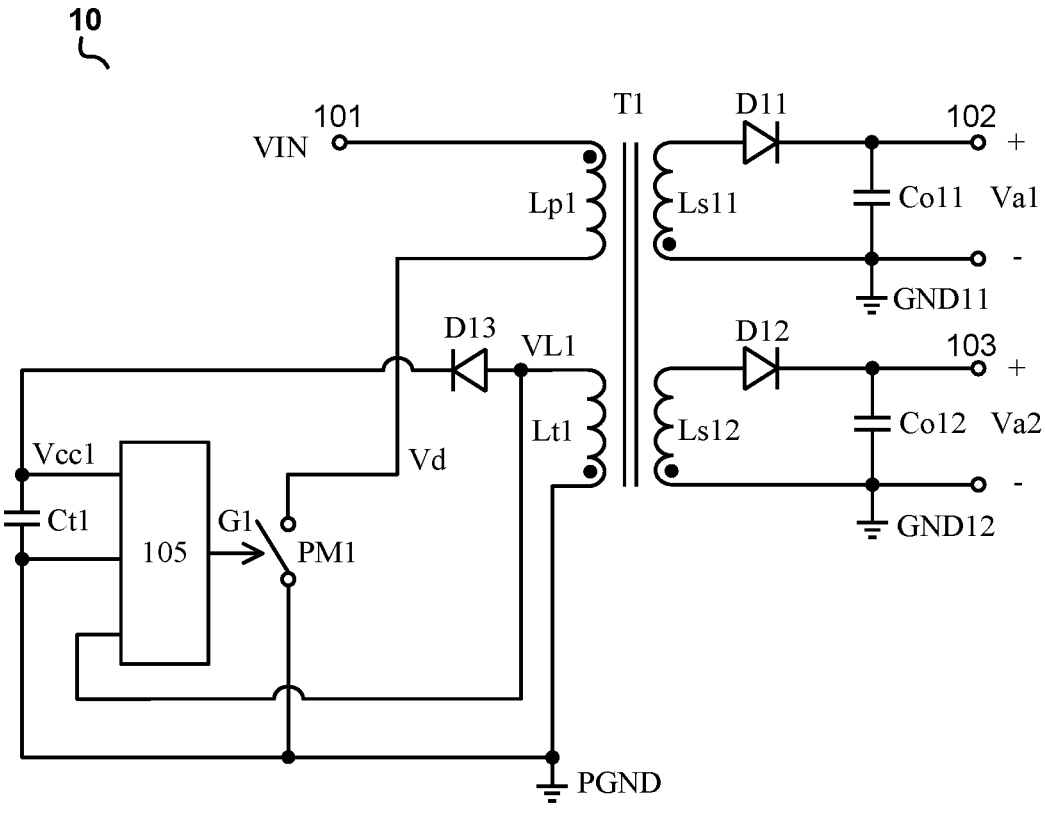
FIG. 1 schematically shows a primary side controlled flyback converter 10 in accordance with an embodiment of the present invention.

FIG. 1 schematically shows a primary side controlled flyback converter 10 in accordance with an embodiment of the present invention. In the example of FIG. 1, the flyback converter 10 comprises: a storage component T1, having a primary winding Lp1, a first secondary winding Ls11, a second secondary winding Ls12, and a power source winding Lt1; a primary switch PM1, coupled between the primary winding Lp1 and a primary ground reference PGND; a first rectifier D11, coupled between the first secondary winding Ls11 and a first output terminal 102 of the flyback converter 10; a second rectifier D12, coupled between the second secondary winding Ls12 and a second output terminal 103 of the flyback converter 10; and a third rectifier D13, coupled between the power source winding Lt1 and a power supply voltage Vcc1; and a control circuit 105, configured to receive the power supply voltage Vcc1 and a power source winding voltage VL1, and provide a switching control signal G1 to control the primary switch PM1. The control circuit 105 and the primary switch PM1 could be integrated in a chip, or could be integrated in two independent chips, to control primary side (including the primary winding Lp1 and all the elements coupled to thereto) of the flyback converter 10. As shown in FIG. 1, a capacitor Co11 is coupled between the first output terminal 102 and a first secondary ground reference GND11, and a first output voltage Va1 is provided on the capacitor Co11; a capacitor Co12 is coupled between the second output terminal 103 and a second secondary ground reference GND12, and a second output voltage Va1 is provided on the capacitor Co12; and a capacitor Ct1 is coupled between the power supply voltage Vcc1 and the primary ground reference PGND. The power supply voltage Vcc1 is provided by the power source winding Lt1 via the third rectifier D13, and is applied to power the control circuit 105.

The flyback converter 10 turns on and off the primary switch PM1, the rectifiers D11, D12 and D13, to transfer energy from the primary side to the secondary sides (each secondary side includes a secondary winding and all the elements attached thereto, the power source winding Lt1 is a secondary winding too, used to provide power to the control circuit 105) of the flyback converter. By setting the turns ratio of the primary winding Lp1 to the secondary windings Ls11, Ls12, Lt1, and controlling the duty cycle of the primary switch PM1, the flyback converter 10 could provide the first output voltage Va1, the second output voltage Va2 and the power supply voltage Vcc1 with required voltage levels.

In the primary side controlled flyback converter 10, the primary side and the secondary sides are isolated, with no opto-coupler feeding back output information. In prior art, the power source winding voltage VL1 during a freewheeling period of the rectifiers is provided as a feedback voltage to the control loop of the flyback converter 10 to regulate the duty cycle of the primary switch PM1. However, in some cases, e.g., output loads are very different, or the output with the lowest power has high accuracy requirement, the output with low power could not be effectively regulated when the power source winding voltage VL1 is used as the feedback voltage.

Figure 2:
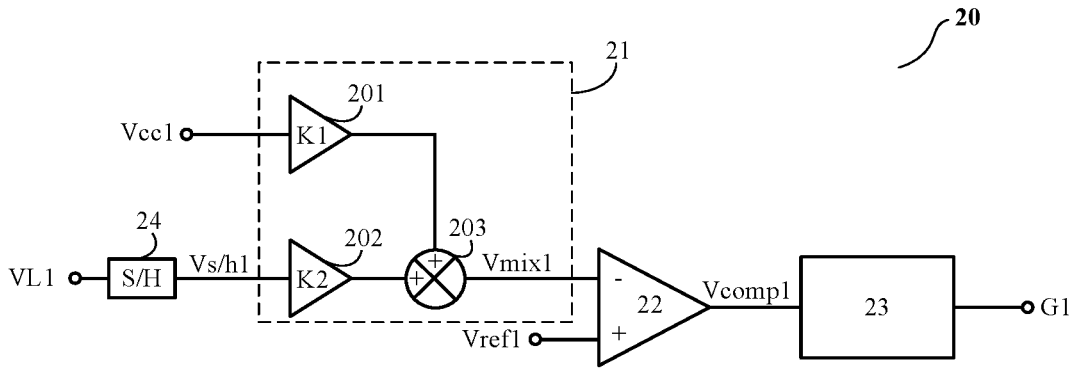
FIG. 2 schematically shows a control circuit 20 in accordance with an embodiment of the present invention.

FIG. 2 schematically shows a control circuit 20 in accordance with an embodiment of the present invention. The control circuit 20 could be used with switching mode power supplies, like the flyback converter 10 in FIG. 1. As shown in FIG. 2, the control circuit 20 comprises: a sample and hold circuit 24, configured to sample and hold the power source winding voltage VL1 during when any one of the rectifiers D11, D12 and D13 is on, and to provide a sample&hold voltage Vs&h1 based thereon; a feedback circuit 21, configured to receive the power supply voltage Vcc1 and the sample&hold voltage Vs&h1, and based on the power supply voltage Vcc1 and the sample&hold voltage Vs&h1, the feedback circuit 21 provides a weighted voltage Vmix1 as a feedback voltage Vfb1; an error amplifier 22, configured to receive the weighted voltage Vmix1 and a reference voltage Vref1, and to provide a compensation signal Vcomp1 based on an amplified error between the weighted voltage Vmix1 and the reference voltage Vref1; and a pulse control circuit 23, configured to receive the compensation signal Vcomp1, and to provide the switching control signal G1 based on the compensation signal Vcomp1.

The sample and hold circuit 24 receives the power source winding voltage VL1, then samples the power source winding voltage VL1 during when any one of the rectifiers (D11, D12 and D13) is on and the ringing of the power source winding voltage VL1 is over, and then holds the sampled value to generate the sample&hold voltage Vs&h1. In application, persons of ordinary skill in the art could calculate the on time periods of the rectifiers, and estimate the ringing time period of the power source winding voltage VL1, based on the specs of the application, thereby avoid the ringing time period of the power source winding voltage VL1, and find a proper sampling point to sample the power source winding voltage VL1.

Any circuit which could generate the switching control signal G1 with a certain duty cycle could be adopted by the present invention, e.g., pulse width modulation (PWM) circuit, pulse frequency modulation (PFM) circuit, a combination of the PWM circuit and the PFM circuit. In one embodiment, when the feedback voltage Vfb1 decreases, the compensation signal Vcomp1 increases. Then after the regulation of the pulse control circuit 23, a duty cycle of the switching control signal G1 increases, wherein the duty cycle of the switching control signal G1 is defined as a ratio of an on time period of the primary switch PM1 to a switching cycle of the primary switch PM1, and wherein the switching cycle of the primary switch PM1 is defined as a repeated time period having an on time period and an off time period of the primary switch PM1. The energy transferred from the primary side to the secondary sides increases as the duty cycle of the switching control signal G1 increases.

In the embodiment of FIG. 2, the feedback circuit 21 is also referred as a weighted circuit, comprising: a first scaling circuit 201, configured to receive the power supply voltage Vcc1, and to provide a first scaling voltage K1×Vcc1, wherein K1 is a first scale factor, and 0<K1<1; a second scaling circuit 202, configured to receive the sample&hold voltage Vs&h1, and to provide a second scaling voltage K2×Vs&h1, wherein K2 is a second scale factor, and 0<K2<1; and an operational circuit 203, configured to receive the first scaling voltage K1×Vcc1 and the second scaling voltage K2×Vs&h1, and to provide a weighted voltage Vmix1 based on the first scaling voltage K1×Vcc1 and the second scaling voltage K2×Vs&h1, wherein Vmix1=K1×Vcc1+K2×Vs&h1, and K1+K2=1.

Figure 3:
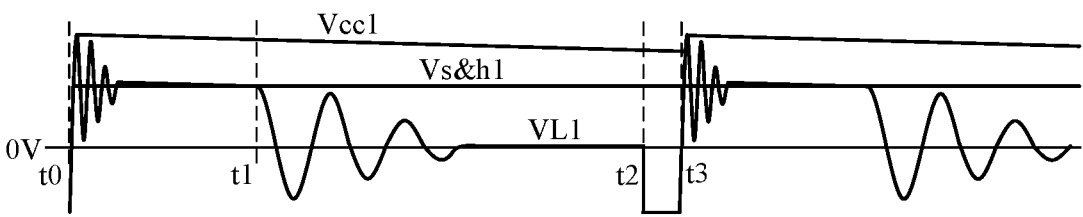
FIG. 3 schematically shows the waveforms of the power supply voltage Vcc1, the power source winding voltage VL1 and the sample&hold voltage Vs&h1 in accordance with an embodiment of the present invention.

FIG. 3 schematically shows the waveforms of the power supply voltage Vcc1, the power source winding voltage VL1 and the sample&hold voltage Vs&h1 in accordance with an embodiment of the present invention. The operation of the control circuit 20 is illustrated referring to FIGS. 1, 2 and 3. As shown in FIG. 3, the primary switch PM1 is turned off at time t0 which is assumed as a beginning of a switching cycle. Then the rectifiers D11, D12 and D13 are turned on, and the power source winding voltage VL1 increases. The power source winding voltage VL1 rings during a short time period after the third rectifier D13 is turned on. The ringing power source winding voltage VL1 charges the capacitor Ct1, followed by the increase of the power supply voltage Vcc1. After the power supply voltage Vcc1 increases to the power source winding voltage VL1, the third rectifier D13 is turned off. The power supply voltage Vcc1 across the capacitor Ct1 is adopted for powering the control circuit 105. Since the third rectifier D13 is turned off, the capacitor Ct1 could not be charged until a next switching cycle. As a result, the power supply voltage Vcc1 keeps decreasing for discharging power to the control circuit 105. The power source winding voltage VL1 is sampled and hold to generate the sample&hold voltage Vs&h1 during a time period from the time the power source winding voltage VL1 stops ringing to the time (t1) all the rectifiers D11-D13 are turned off. At time t2, the primary switch PM1 is turned on, the sample&hold voltage Vs&h1 maintains unchanged. Generally, as shown in FIG. 3, the power supply voltage Vcc1 has a higher value than the power source winding voltage VL1, but keeps decreasing from the beginning of the switching cycle. At time t3, the primary switch PM1 is turned off again, the next switching cycle begins, and the operation repeats.

The power supply voltage Vcc1 powers the control circuit 105 that could be regarded as a light load of the flyback converter 10. By contrast, the sample&hold voltage Vs&h1 represents an output voltage provided to a heavy load. The feedback circuit 21 in FIG. 2 superimposes the power supply voltage Vcc1 and the sample&hold voltage Vs&h1 after weighting, to provide a feedback voltage Vfb1 that could not only reflect the light load, but also reflect the heavy load. As a result, the light load output and the heavy load output could both be regulated. In FIG. 2, values of the scale factor K1 and K2 are determined by requirements of the application. For example, in the application the output with heavy load has a higher requirement of accuracy, the second scale factor K2 is relatively larger compared with the first scale factor K1, e.g., K1=0.2 when K2=0.8, and vice versa.

Figure 4:
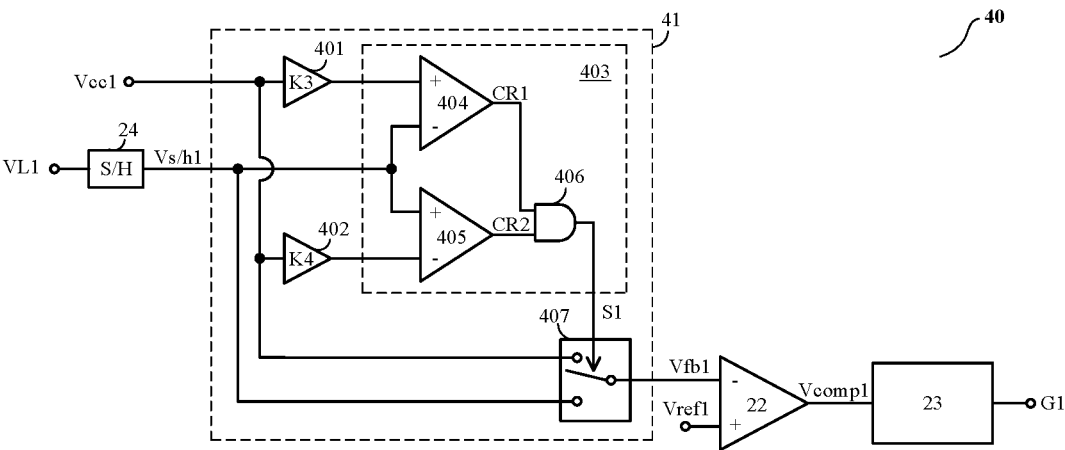
FIG. 4 schematically shows a control circuit 40 in accordance with an embodiment of the present invention.

FIG. 4 schematically shows a control circuit 40 in accordance with an embodiment of the present invention. The control circuit 40 could be used with switching mode power supplies, like the flyback converter 10 in FIG. 1. As shown in FIG. 4, the control circuit 40 comprises: the sample and hold circuit 24, configured to sample and hold the power source winding voltage VL1 during when any one of the rectifiers D11, D12 and D13 is on, and to provide the sample&hold voltage Vs&h1 based thereon; a feedback circuit 41, configured to receive the power supply voltage Vcc1 and the sample&hold voltage Vs&h1, and based on the power supply voltage Vcc1 and the sample&hold voltage Vs&h1, the feedback circuit 41 provides the feedback voltage Vfb1; the error amplifier 22, configured to receive the feedback voltage Vfb1 and the reference voltage Vref1, and to provide the compensation signal Vcomp1 based on the amplified error between the feedback voltage Vfb1 and the reference voltage Vref1; and the pulse control circuit 23, configured to receive the compensation signal Vcomp1, and to provide the switching control signal G1 based on the compensation signal Vcomp1.

In the embodiment of FIG. 4, the feedback circuit 41 comprises: a third scaling circuit 401, configured to receive the power supply voltage Vcc1, and to provide a third scaling voltage K3×Vcc1, wherein K3 is a third scale factor, and 1<K3<2; a fourth scaling circuit 402, configured to receive the power supply voltage Vcc1, and to provide a fourth scaling voltage K4×Vcc1, wherein K4 is a fourth scale factor, and 0<K4<1; a hysteresis comparator 403, configured to receive the third scaling voltage K3×Vcc1, the fourth scaling voltage K4×Vcc1, and the sample&hold voltage Vs&h1, and based on a comparison result of the third scaling voltage K3×Vcc1, the fourth scaling voltage K4×Vcc1, and the sample&hold voltage Vs&h1, the hysteresis comparator 403 provides a selecting signal S1, wherein when the value of the sample&hold voltage Vs&h1 is between the third scaling voltage K3×Vcc1 and the fourth scaling voltage K4×Vcc1, the selecting signal S1 has a first state, otherwise, the selecting signal S1 has a second state; and a selecting circuit 407, configured to receive the selecting signal S1, the power supply voltage Vcc1 and the sample&hold voltage Vs&h1, wherein the power supply voltage Vcc1 or the sample&hold voltage Vs&h1 is selected to be the feedback voltage Vfb1 based on the selecting signal S1.

The states of the selecting signal S1 are decided by the requirement of the application. In some embodiments, logical high level represents the first state of the selecting signal S1, and logical low level represents the second state of the selecting signal S1, or just the opposite.

In the embodiment of FIG. 4, when the value of the sample&hold voltage Vs&h1 is between the third scaling voltage K3×Vcc1 and the fourth scaling voltage K4×Vcc1, i.e., K4×Vcc1<Vs&h1<K3×Vcc1, the sample&hold voltage Vs&h1 is selected by the selecting circuit 407 to be the feedback voltage Vfb1. When the value of the sample&hold voltage Vs&h1 is smaller than the fourth scaling voltage K4×Vcc1, or is larger than the third scaling voltage K3×Vcc1, which means the ringing of the power source winding voltage VL1 may be sampled and hold as the sample&hold voltage Vs&h1, and the sample&hold voltage Vs&h1 could not reflect the load, then the power supply voltage Vcc1 is selected as the feedback voltage Vfb1.

In the embodiment of FIG. 4, the hysteresis comparator 403 comprises: a first comparator 404, configured to receive the third scaling voltage K3×Vcc1 and the sample&hold voltage Vs&h1, and to provide a first comparison signal CR1 based on a comparison result of the third scaling voltage K3×Vcc1 and the sample&hold voltage Vs&h1; a second comparator 405, configured to receive the fourth scaling voltage K4×Vcc1, and the sample&hold voltage Vs&h1, and to provide a second comparison signal CR2 based on a comparison result of the fourth scaling voltage K4×Vcc1 and the sample&hold voltage Vs&h1; and a logic circuit 406, configured to receive the first comparison signal CR1 and the second comparison signal CR2, and to provide the selecting signal S1 based on the first comparison signal CR1 and second comparison signal CR2.

In one embodiment, K3=1.2 and K4=0.8. When 0.8×Vcc1<Vs&h1<1.2×Vcc1, the first comparison signal CR1 and the second comparison signal CR2 are logical high, then the logic circuit 406 provides a logical high selecting signal S1. Under the control of the logical high selecting signal S1, the selecting circuit 407 provides the sample&hold voltage Vs&h1 as the feedback voltage Vfb1. When Vs&h1≤0.8×Vcc1 or Vs&h1≥1.2×Vcc1, the second comparison signal CR2 or the first comparison signal CR1 is logical low. Then the logic circuit 406 provides a logical low selecting signal S1. Under the control of the logical low selecting signal S1, the selecting circuit 407 provides the power supply voltage Vcc1 as the feedback voltage Vfb1.

Figure 5:
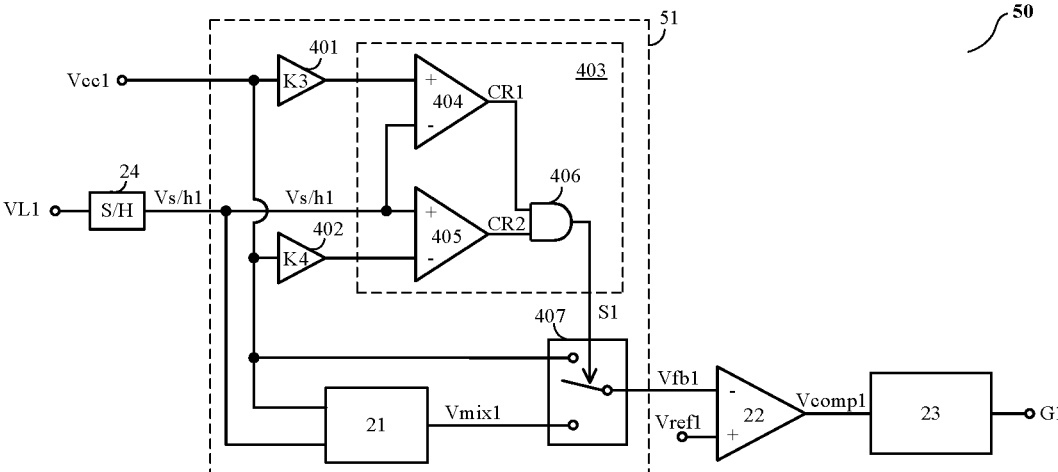
FIG. 5 schematically shows a control circuit 50 in accordance with an embodiment of the present invention.

FIG. 5 schematically shows a control circuit 50 in accordance with an embodiment of the present invention. The control circuit 50 could be used with switching mode power supplies, like the flyback converter 10 in FIG. 1. As shown in FIG. 5, the control circuit 50 comprises: the sample and hold circuit 24, configured to sample and hold the power source winding voltage VL1 during when any one of the rectifiers D11, D12 and D13 is on, and to provide the sample&hold voltage Vs&h1 based thereon; a feedback circuit 51, configured to receive the power supply voltage Vcc1 and the sample&hold voltage Vs&h1, and to provide the feedback voltage Vfb1 based on the power supply voltage Vcc1 and the sample&hold voltage Vs&h1; the error amplifier 22, configured to receive the feedback voltage Vfb1 and the reference voltage Vref1, and to provide the compensation signal Vcomp1 based on the amplified error between the feedback voltage Vfb1 and the reference voltage Vref1; and the pulse control circuit 23, configured to receive the compensation signal Vcomp1, and to provide the switching control signal G1 based on the compensation signal Vcomp1.

In the embodiment of FIG. 5, the feedback circuit 51 comprises: the third scaling circuit 401, configured to receive the power supply voltage Vcc1, and to provide the third scaling voltage K3×Vcc1; the fourth scaling circuit 402, configured to receive the power supply voltage Vcc1, and to provide the fourth scaling voltage K4×Vcc1; a hysteresis comparator 403, configured to receive the third scaling voltage K3×Vcc1, the fourth scaling voltage K4×Vcc1, and the sample&hold voltage Vs&h1, and based on a comparison result of the third scaling voltage K3×Vcc1, the fourth scaling voltage K4×Vcc1, and the sample&hold voltage Vs&h1, the hysteresis comparator 403 provides the selecting signal S1, wherein when the value of the sample&hold voltage Vs&h1 is between the third scaling voltage K3×Vcc1 and the fourth scaling voltage K4×Vcc1, the selecting signal S1 has a first state, otherwise, the selecting signal S1 has a second state; and a weighting circuit 21, configured to receive the power supply voltage Vcc1 and the sample&hold voltage Vs&h1, and based on the power supply voltage Vcc1 and the sample&hold voltage Vs&h1, the weighting circuit 21 provides the weighted voltage Vmix1; and the selecting circuit 407, configure to receive the selecting signal S1, the power supply voltage Vcc1, and the weighted voltage Vmix1, wherein one of the power supply voltage Vcc1 and the weighted voltage Vmix1 is selected to be the feedback voltage Vfb1 based on the selecting signal S1.

In the embodiment of FIG. 5, when the value of the sample&hold voltage Vs&h1 is between the third scaling voltage K3×Vcc1 and the fourth scaling voltage K4×Vcc1, i.e., K4×Vcc1<Vs&h1<K3×Vcc1, the weighted voltage Vmix1 is selected by the selecting circuit 407 to be the feedback voltage Vfb1. When the value of the sample&hold voltage Vs&h1 is smaller than the fourth scaling voltage K4×Vcc1, or is larger than the third scaling voltage K3×Vcc1, which means the ringing of the power source winding voltage VL1 may be sampled and hold as the sample&hold voltage Vs&h1, and the sample&hold voltage Vs&h1 could not reflect the load, then the power supply voltage Vcc1 is selected to be the feedback voltage Vfb1.

Figure 6:
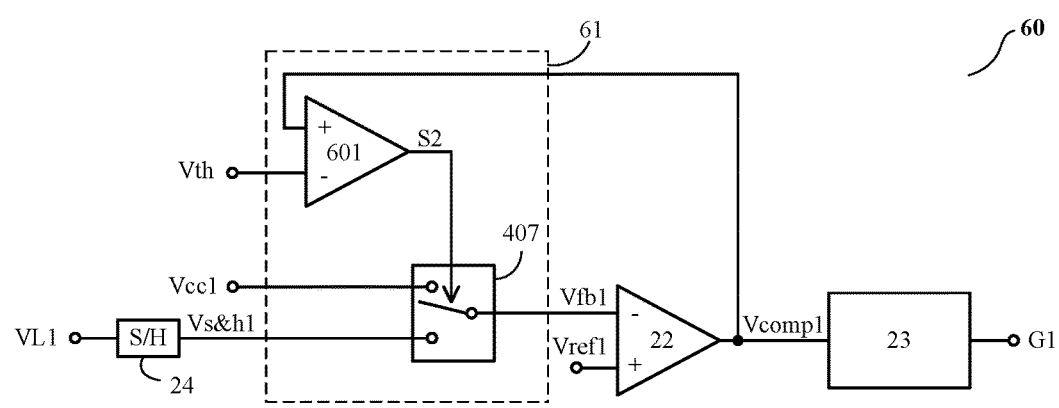
FIG. 6 schematically shows a control circuit 60 in accordance with an embodiment of the present invention.

FIG. 6 schematically shows a control circuit 60 in accordance with an embodiment of the present invention. The control circuit 60 could be used with switching mode power supplies, like the flyback converter 10 in FIG. 1. As shown in FIG. 6, the control circuit 60 comprises: the sample and hold circuit 24, configured to sample and hold the power source winding voltage VL1 during when any one of the rectifiers D11, D12 and D13 is on, and to provide the sample&hold voltage Vs&h1 based thereon; a feedback circuit 61, configured to receive the compensation signal Vcomp1, a threshold signal Vth, the power supply voltage Vcc1 and the sample&hold voltage Vs&h1, and to provide the feedback voltage Vfb1 based on the compensation signal Vcomp1, the threshold signal Vth, the power supply voltage Vcc1 and the sample&hold voltage Vs&h1; the error amplifier 22, configured to receive the feedback voltage Vfb1 and the reference voltage Vref1, and to provide the compensation signal Vcomp1 based on the amplified error between the feedback voltage Vfb1 and the reference voltage Vref1; and the pulse control circuit 23, configured to receive the compensation signal Vcomp1, and to provide the switching control signal G1 based on the compensation signal Vcomp1.

In the embodiment of FIG. 6, the feedback circuit 61 comprises: a load comparison circuit 601, configured to receive the compensation signal Vcomp1 and the threshold signal Vth, and to provide a selecting signal S2 based on a comparison result of the compensation signal Vcomp1 and the threshold signal Vth; and the selecting circuit 407, configured to receive the selecting signal S2, the power supply voltage Vcc1 and the sample&hold voltage Vs&h1, wherein the power supply voltage Vcc1 or the sample&hold voltage Vs&h1 is selected to be the feedback voltage Vfb1 based on the selecting signal S1.

In FIG. 6, a heavy load condition is determined when the compensation signal Vcomp1 is larger than the threshold signal Vth, otherwise, a light load condition is determined. Under the heavy load condition, the selecting signal S2 has a first state, and the selecting circuit 407 provides the sample&hold voltage Vs&h1 as the feedback voltage Vfb1. Under light load condition, the selecting signal S2 has a second state, and the selecting circuit 407 provides the power supply voltage Vcc1 as the feedback voltage Vfb1. The first state and the second state could respectively be the logical high state and the logical low state, or just the opposite, according to the application requirement.

Under the control of the feedback circuit 61, the control circuit 60 takes the sample&hold voltage Vs&h1 as the feedback voltage Vfb1 to focus on regulating the output with a heavier load when the overall load is heavy, and takes the power supply voltage Vcc1 as the feedback voltage Vfb1 to focus on regulating the output with a lighter load when the overall load is light, so as to effectively regulate both the output with heavier load and the output with lighter load.

The threshold signal Vth is adopted to determine the load condition of the system, and the value of the threshold signal Vth could be decided according to the application.

Figure 7:
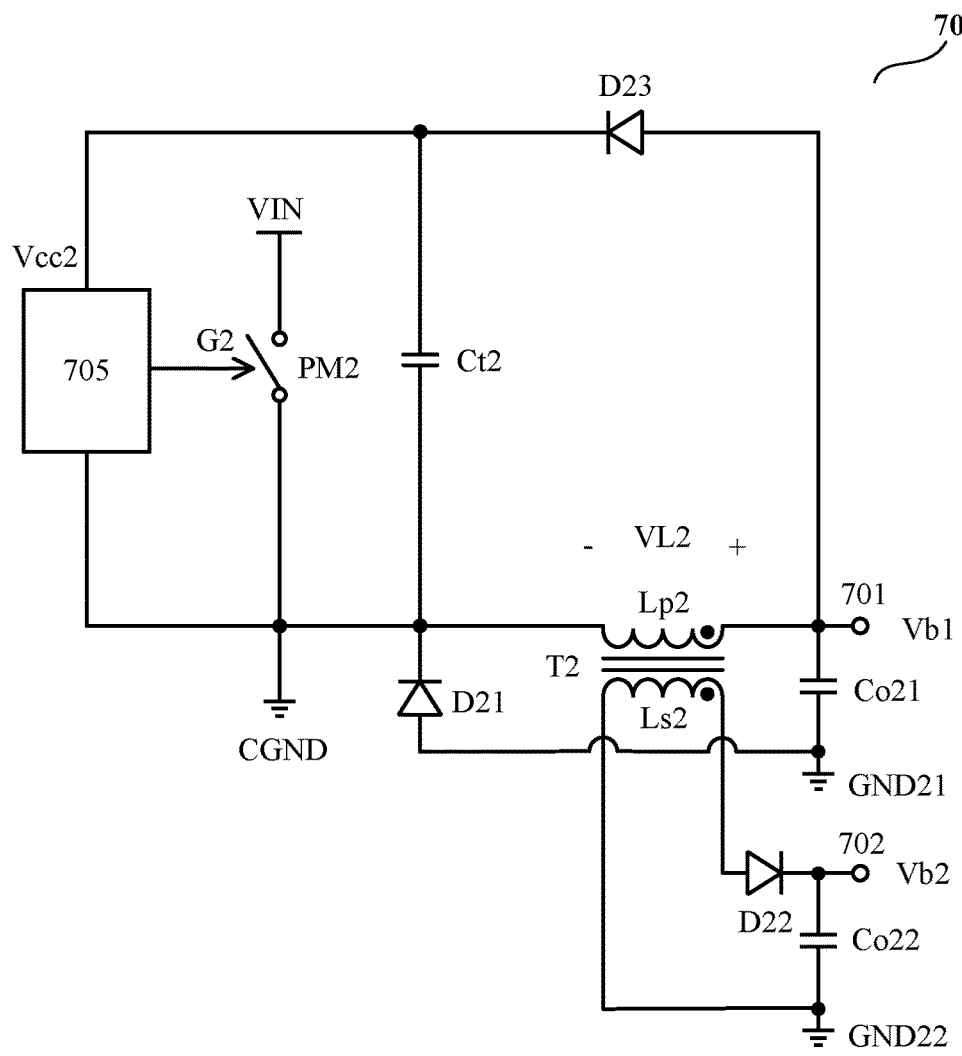
FIG. 7 schematically shows a prior art flybuck converter 70.

FIG. 7 schematically shows a prior art flybuck converter 70. As shown in FIG. 7, the flybuck converter 70 comprises: an energy storage component T1 having a primary winding Lp2 and a secondary winding Ls2; a rectifier D21, coupled between a first terminal of the primary winding Lp2 and a primary ground reference GND21, wherein a second terminal of the primary winding Lp2 provides a first output voltage Vb1; a primary switch PM2, coupled between an input voltage VIN and a control ground reference CGND (also referred as a switching terminal of the flybuck converter 70); a rectifier D22, coupled between the secondary winding Ls2 and a second output voltage Vb2; a control circuit 705, configured to receive a power supply voltage Vcc2, and to provide a switching control signal G2 to the primary switch PM2. As shown in FIG. 7, a capacitor Co21 is coupled between a first output terminal 701 and the primary ground reference GND21, and the first output voltage Vb1 is the voltage across the capacitor Co21; a capacitor Co22 is coupled between a second output terminal 702 and a secondary ground reference GND22, and the second output voltage Vb2 is the voltage across the capacitor Co22; and a capacitor Ct2 is coupled between the power supply voltage Vcc2 and the control ground reference CGND to maintain the power supply voltage Vcc2 which is used to power the control circuit 705. By controlling the on and off of the primary switch PM2, the rectifiers D21, D22 and D23, the flybuck converter 70 converts the input voltage VIN to the first output voltage Vb1, the second output voltage Vb2 and the power supply voltage Vcc2 with required voltage levels. The control circuit 705 and the primary switch PM2 could be integrated in a single primary control chip, or could be respectively integrated in two independent chips.

Figure 8:
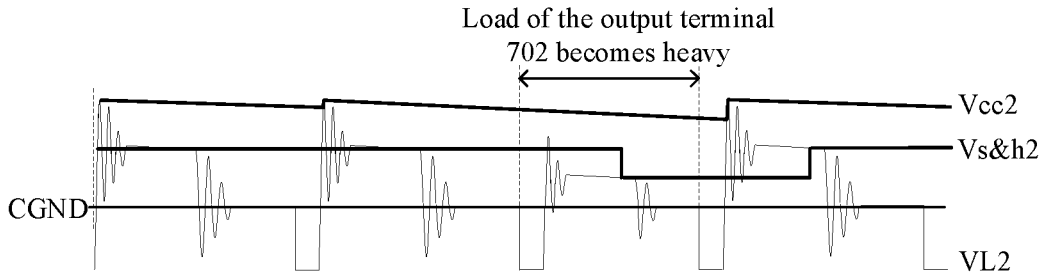
FIG. 8 schematically shows waveforms of the power supply voltage Vcc2, a primary winding voltage VL2, and a sample&hold voltage Vs&h2 in accordance with an embodiment of the present invention.

In prior art, the power supply voltage Vcc2 is provided as a feedback voltage to the control circuit 705, to participate in the control control to regulate the outputs of the flybuck converter 70. However, when the load of the second output voltage Vb2 is heavy, the outputs of the flybuck converter 70 could not be regulated effectively by feeding back the power supply voltage Vcc2. FIG. 8 schematically shows waveforms of the power supply voltage Vcc2, a primary winding voltage VL2, and a sample&hold voltage Vs&h2 in accordance with an embodiment of the present invention, wherein the sample&hold voltage Vs&h2 is generated by sampling and holding the primary winding voltage VL2 during when any one of the rectifiers (D21, D22 or D23) is on and the ringing of the primary winding voltage VL2 is over. When the load of the output terminal 702 becomes heavy, the second output voltage Vb2 decreases, meanwhile, the on time of the rectifier D21 becomes short, which causes the decrease of the primary winding voltage VL2, then followed by the decreasing of the sample&hold voltage Vs&h2 as shown in FIG. 8. Meanwhile, the first output voltage Vb1 decreases too.

When the secondary side of the flybuck converter 70, i.e., the second output voltage Vb2 is heavily loaded, the sample&hold voltage Vs&h2 is needed in the control loop to fast recover the first output voltage Vb1 and the second voltage Vb2.

Figure 9:
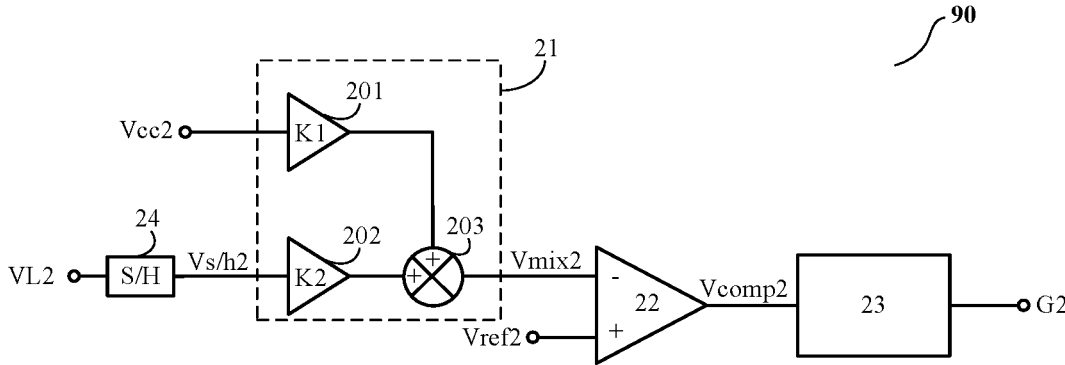
FIG. 9 schematically shows a control circuit 90 in accordance with an embodiment of the present invention.

FIG. 9 schematically shows a control circuit 90 in accordance with an embodiment of the present invention. The control circuit 90 could be used as the control circuit 705 of the flybuck converter 70 in FIG. 7. The control circuit 90 in FIG. 9 works similarly with the control circuit 20 in FIG. 2. In FIG. 9, the sample&hold voltage Vs&h2, and the power supply voltage Vcc2 are provided to the weighting circuit 21 to obtain a fifth scaling voltage K1×Vcc2, a sixth scaling voltage K2×Vs&h2, and a weighted voltage Vmix2=K1× Vcc2+K2×Vs&h2. The weighted voltage Vmix2 is provided as a feedback voltage Vfb2 to participate in the control loop to generate the switching control signal G2 to control the primary switch PM2, so as to make sure all the outputs are regulated quickly. The first scale factor K1 and the second scale factor K2 are determined by the application, wherein, 0<K1<1, 0<K2<1, and K1+K2=1.

Figure 10:
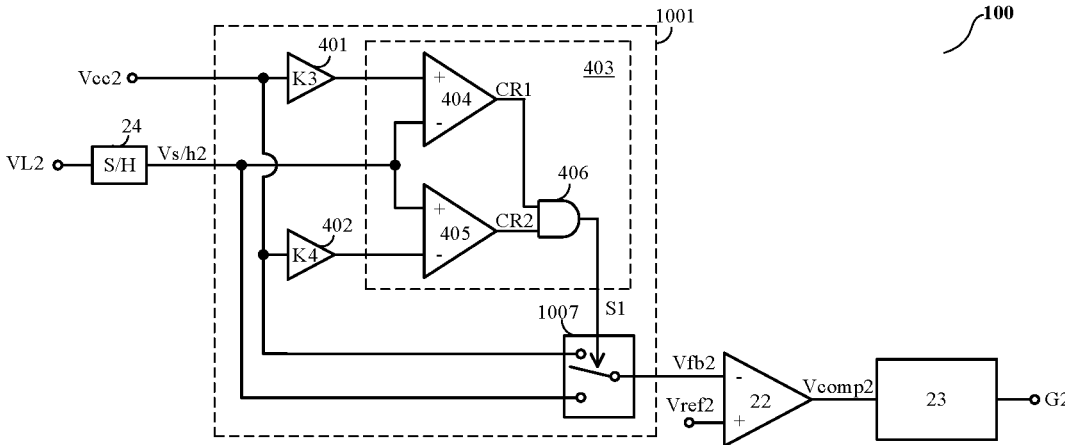
FIG. 10 schematically shows a control circuit 100 in accordance with an embodiment of the present invention.

FIG. 10 schematically shows a control circuit 100 in accordance with an embodiment of the present invention. The control circuit 100 could be used as the control circuit 705 of the flybuck converter 70 in FIG. 7. The control circuit 100 in FIG. 10 works similarly with the control circuit 40 in FIG. 4. In FIG. 10, when the value of the sample&hold voltage Vs&h2 is between a value of a seventh scaling voltage K3×Vcc2 and a value of a eighth scaling voltage K4×Vcc2, the sample&hold voltage Vs&h2 is selected by the selecting circuit 1007 to be the feedback voltage Vfb2, otherwise, the power supply voltage Vcc2 is selected by the selecting circuit 1007 to be the feedback voltage Vfb2, to participate in the control loop to generate the switching control signal G2 to control the primary switch PM2, so as to make sure all the outputs are regulated quickly.

Figure 11:
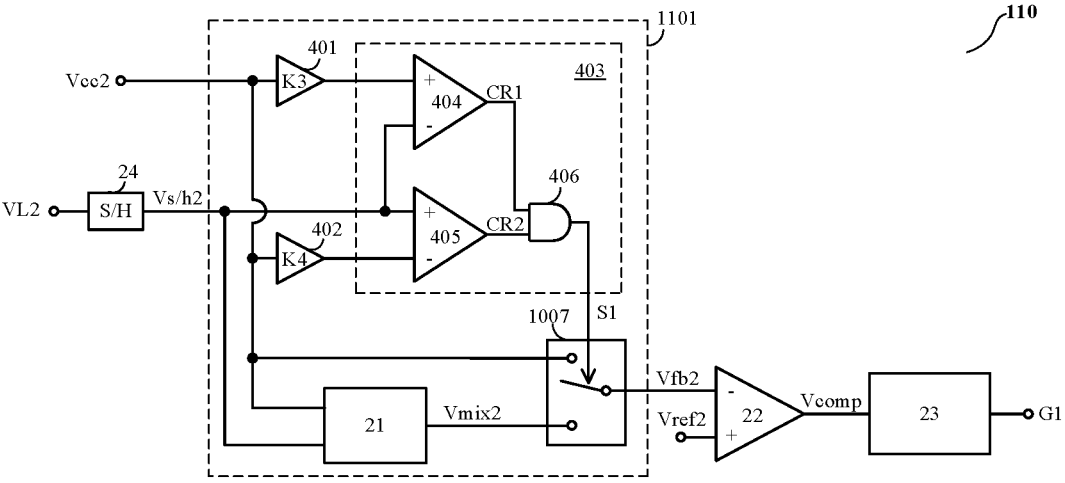
FIG. 11 schematically shows a control circuit 110 in accordance with an embodiment of the present invention.

FIG. 11 schematically shows a control circuit 110 in accordance with an embodiment of the present invention. The control circuit 110 could be used as the control circuit 705 of the flybuck converter 70 in FIG. 7. The control circuit 110 in FIG. 11 works similarly with the control circuit 50 in FIG. 5. In FIG. 11, when the value of the sample&hold voltage Vs&h2 is between the value of the seventh scaling voltage K3×Vcc2 and the value of the eighth scaling voltage K4×Vcc2, the power supply voltage Vcc2 is selected to be the feedback voltage Vfb2, otherwise, the weighted voltage Vmix2 provided by the weighting circuit 21 is selected to be the feedback voltage Vfb2, to participate in the control loop to generate the switching control signal G2 to control the primary switch PM2, so as to make sure all the outputs are regulated quickly.

The present invention is illustrated by embodiments of dual-output switching converters, namely the flyback converter 10 in FIG. 1 and the flybuck converter 70 in FIG. 7. However, it should be understood that the present invention could also be applied to switching converters with more than two outputs.

FIG. 3 shows the waveforms of the signals when the flyback converter 10 works under the current discontinuous mode (DCM), and FIG. 8 shows the waveforms of the signals when the flybuck converter 70 works under the current discontinuous mode (DCM). Persons of ordinary skill in the art should understand that the flyback converter 10 and the flybuck converter 70 could also work under other modes. The work principle of the flyback converter 10 and the flybuck converter 70 under DCM are provided for illustration.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A control circuit, for controlling a switching converter with a primary switch, an energy storage component and a plurality of rectifiers, the control circuit comprising:
   a sample and hold circuit, configured to sample and hold a power source winding voltage provided by a power source winding of the energy storage component during when any one of the plurality of rectifiers is on, and to provide a sample&hold voltage based thereon; and
   a feedback circuit, configured to receive the sample&hold voltage and a power supply voltage for supplying power to the control circuit to maintain an operation of the control circuit, and to provide a feedback voltage based on the power supply voltage and the sample&hold voltage, for controlling the primary switch; and wherein the feedback circuit comprises:

a first scaling circuit, configured to receive the power supply voltage, and to provide a first scaling voltage which is a product of the power supply voltage and a first scale factor;

a second scaling circuit, configured to receive the sample&hold voltage, and to provide a second scaling voltage which is a product of the sample&hold voltage and a second scale factor; and an operational circuit, configured to receive the first scaling voltage and the second scaling voltage, and based on the first scaling voltage and the second scaling voltage, the operational circuit provides the feedback voltage which is a sum of the first scaling voltage and the second scaling voltage.

2. The control circuit of claim 1, further comprising:

an error amplifier, configured to receive the feedback voltage and a reference voltage, and based on an amplified error between the feedback voltage and the reference voltage, the error amplifier provides a compensation signal; and a pulse control circuit, configured to receive the compensation signal, and based on the compensation signal, the pulse control circuit provides a switching control signal to control the primary switch.

3. The control circuit of claim 1, wherein:

both the first scale factor and the second scale factor are constants having values between 0 and 1, and a sum of the first scale factor and the second scale factor is 1.

4. A switching converter having with a flyback topology, comprising:

a primary switch, coupled to a primary winding of an energy storage component;

a sample and hold circuit, configured to sample and hold a power source winding voltage provided by a power source winding of the energy storage component, and to provide a sample&hold voltage based thereon; and a feedback circuit, configured to receive the sample&hold voltage and a power supply voltage for supplying power to a control circuit for controlling the primary switch, and to provide a feedback voltage based on the power supply voltage and the sample&hold voltage, for controlling the primary switch; and wherein the feedback circuit comprises:

a first scaling circuit, configured to receive the power supply voltage, and to provide a first scaling voltage which is a product of the power supply voltage and a first scale factor:

a second scaling circuit, configured to receive the sample&hold voltage, and to provide a second scaling voltage which is a product of the sample&hold voltage and a second scale factor; and an operational circuit, configured to receive the first scaling voltage and the second scaling voltage, and based on the first scaling voltage and the second scaling voltage, the operational circuit provides the feedback voltage which is a sum of the first scaling voltage and the second scaling voltage.

5. The switching converter of claim 4, further comprising:

an error amplifier, configured to receive the feedback voltage and a reference voltage, and based on an amplified error between the feedback voltage and the reference voltage, the error amplifier provides a compensation signal; and a pulse control circuit, configured to receive the compensation signal, and based on the compensation signal, the pulse control circuit provides a switching control signal to control the primary switch.

6. The switching converter of claim 4, further comprising:

the energy storage component, having the primary winding, the power source winding, and at least two secondary windings, wherein the primary switch is coupled to the primary winding; and at least three rectifiers of the plurality of rectifiers, coupled respectively to the power source winding and the at least two secondary windings, wherein the rectifier coupled to the power source winding has a first terminal coupled to the power source winding to receive the power source winding voltage, and a second terminal configured to provide the power supply voltage.

7. The switching converter of claim 4, wherein:

both the first scale factor and the second scale factor are constants having values between 0 and 1, and a sum of the first scale factor and the second scale factor is 1.

8. A control circuit for a switching converter having a flybuck topology with an energy storage component, a primary switch and a rectifier, the control circuit comprising:

a sample and hold circuit, configured to sample and hold a primary winding voltage provided by a primary winding of the energy storage component during when the rectifier is on, and to provide a sample&hold voltage based thereon;

a feedback circuit, configured to receive a power supply voltage for supplying power to the control circuit to maintain an operation of the control circuit, and the sample&hold voltage, and to provide a feedback voltage based on the power supply voltage and the sample&hold voltage for controlling the primary switch; and wherein the feedback circuit comprises:

a first scaling circuit, configured to receive the power supply voltage, and to provide a first scaling voltage which is a product of the power supply voltage and a first scale factor;

a second scaling circuit, configured to receive the sample&hold voltage, and to provide a second scaling voltage which is a product of the sample&hold voltage and a second scale factor; and an operational circuit, configured to receive the first scaling voltage and the second scaling voltage, and based on the first scaling voltage and the second scaling voltage, the operational circuit provides the feedback voltage which is a sum of the first scaling voltage and the second scaling voltage.

9. The control circuit of claim 8, further comprising:

an error amplifier, configured to receive the feedback voltage and a reference voltage, and based on an amplified error between the feedback voltage and the reference voltage, the error amplifier provides a compensation signal; and a pulse control circuit, configured to receive the compensation signal, and based on the compensation signal, the pulse control circuit provides a switching control signal to control the primary switch.

10. The control circuit of claim 8, wherein:

both the first scale factor and the second scale factor are constants having values between 0 and 1, and a sum of the first scale factor and the second scale factor is 1.

* * * * *